United States Patent [19]

Kerkhoff et al.

[11] Patent Number: 4,731,291

[45] Date of Patent: Mar. 15, 1988

[54] WATER-RESISTANT PHOTOGRAPHIC PAPER SUPPORT

[75] Inventors: Alois-Bernhard Kerkhoff, Bissendorf; Dietmar Bunke, GM-Hutte, both of Fed. Rep. of Germany

[73] Assignee: Felix Schoeller, Jr. GmbH & Co. KG, Osnabruck, Fed. Rep. of Germany

[21] Appl. No.: 933,488

[22] Filed: Nov. 21, 1986

[30] Foreign Application Priority Data

Dec. 10, 1985 [DE] Fed. Rep. of Germany ....... 3543597

[51] Int. Cl.[4] ........................ B32B 27/32; B32B 29/00; G03C 1/76

[52] U.S. Cl. .................................... 428/342; 428/513; 428/537.7; 430/530; 264/176.1

[58] Field of Search .................... 428/342, 513, 537.7, 428/464

[56] References Cited

U.S. PATENT DOCUMENTS

| | | | |
|---|---|---|---|
| 4,327,174 | 4/1982 | von Meer | 428/342 X |
| 4,478,910 | 10/1984 | Oshima et al. | 428/342 X |

FOREIGN PATENT DOCUMENTS

| | | | |
|---|---|---|---|
| 7305887R | 2/1973 | Japan | 428/342 |
| 2066732A | 7/1981 | United Kingdom | 428/342 |
| 2109704A | 6/1983 | United Kingdom . | |

*Primary Examiner*—P. C. Ives

[57] ABSTRACT

A photographic paper support material for photographic purposes is disclosed with a polyolefin coating on both sides, wherein the base paper is internally sized by using a hydrophobizing sizing agent, and is surface sized with an aqueous coating mixture. The aqueous coating mixture contains a carboxyl-modified polyvinyl alcohol and optionally includes compounds with polyvalent cations. The paper support material is preferably used with such photographic layers as require wet development and wet fixing of the photographic image with photographic processing solutions.

20 Claims, No Drawings

WATER-RESISTANT PHOTOGRAPHIC PAPER SUPPORT

The invention relates to resin coated paper support material for photographic layers.

In particular, the invention is directed to coated paper support materials for silver halide photographic layers which require a wet development or a wet fixing of the photographic image with the aid of photographic processing solutions.

The base paper in the photographic support material of the invention is thoroughly protected against the influence of the photographic processing solutions, and in particular the cut edges are essentially free from contamination by the processing solutions.

Previously, baryta coated papers, the surface of which has a so-called baryta layer comprising essentially barium sulfate and gelatine, were used as support materials for photosensitive layers, especially silver salt layers for black-and-white and color photography.

In order to be able to satisfy the requirements of the new automatic rapid development processes on the photographic support materials, water-resistant photographic supports have been described which are coated on both surfaces with polyolefin layers. The upper polyolefin coating layer of this water-resistant photographic support onto which a photographic emulsion layer is to be applied, usually contains a white pigment to increase image definition.

The resin coated paper support material is essentially protected on both surfaces against the effect of the usual photographic processing solutions. This protection is only interrupted at the edges of the coated papers. Because of the natural absorbency of paper, the solutions penetrate at the edges into the paper core and cannot be completely removed subsequently, even during subsequent immersion in water. Since the solutions contain substances which discolor darkly upon the entrance of air or under the effect of light, penetrated photographic processing solutions appear, after a short time, as darkly discolored edges which leads to a reduction of the value of the photographic material.

In order to reduce the problem of penetration of processing solutions and contamination of the edges of the photographic support, the base paper is usually sized with strongly hydrophobizing internal sizing agents by adding sizing agents to the pulp during the manufacture of the base paper.

It has also been attempted to apply hydrophobizing agents, after cutting, to the newly cut edges which are affected.

However, the results of both these processes do not satisfy the requirements made on a qualitatively high-valued photographic material.

In DOS No. 32 41 599, it was proposed to seal the paper core through the application of a polyvinyl alcohol carboxylized with maleinic acid or itaconic acid. However, those processes could not be fully satisfactory as to both the contamination of the edges and the internal strength of the paper core. Furthermore, the adhesion between the polyolefin coating and the base paper was not uniformly good. Adhesion tests provided sharply fluctuating values.

It is therefore an objective of this invention to provide a water-resistant photographic paper support material which is free from the disadvantages described, that is, which has almost no contamination of the edges during its use in an automatic rapid development process, and the base paper of which has the internal strength necessary for use in photographic support materials.

The photographic support material in accordance with the invention comprises a base paper and polyolefin coatings on both surfaces. The polyolefin coatings may contain light-reflecting white pigments (particularly in the coating of the front side), as well as colored pigments, optical brighteners, dye stuffs, anti-static agents, dispersing agents for the pigment, anti-oxidants and the like.

The base paper is produced in the known manner on a paper machine. Thereby the paper fiber pulp is sized by using alkylketenedimers or fatty acids or fatty acid salts, epoxied fatty acid amides or anhydrides of fatty acids, as well as mixtures of these. The base paper may contain synthetic fibers in addition to or instead of cellulose fibers. Furthermore, it may contain mineral or organic fillers, white pigments, coloring agents or coloring pigments, optical brighteners, anti-oxidants and/or other additives which are normal to the production of photographic supports, such as, for example, strengthening resins. Base paper of any basis weight and any density can be used.

In accordance with the invention, the base paper is surface sized or impregnated with an aqueous solution containing carboxylated polyvinyl alcohol. Such carboxylated polyvinyl alcohol is a copolymer of vinyl alcohol and ethylenically unsaturated monobasic carboxylic acid, such as crotonic or isocrotonic acid, or acrylic or methacrylic acid. The vinyl alcohol-crotonic acid copolymer, in accordance with the invention, is the most preferred.

The carboxylated polyvinyl alcohols have a viscosity of 20 to 50 mPa's in a 4% aqueous solution at room temperature. The average molecular weight may be 5,000 to 20,000, and is preferably 7,000 to 10,000.

The carboxylated polyvinyl alcohols used in accordance with the invention are applied from aqueous solutions by using known and customarily used application processes. The application weight may be 0.5 to 10 $g/m^2$, and is preferably 1 to 4.5 $g/m^2$.

With an application weight of less than 0.5 $g/m^2$, no sufficient impregnation of the base paper is achieved and the penetration of the photographic processing solutions into the edges, as well as the contamination of the edges by the processing solutions cannot be completely avoided to the desired extent.

It has been found that the effect in accordance with the invention is only obtained with copolymers with a saponification grade of at least 96%. If the saponification grade is less than 96%, no satisfactory sealing of the paper core against the penetration of the photographic processing solutions is achieved.

It has furthermore been found that the advantages described in accordance with the invention, namely the reduction of the penetration of the photographic processing solutions, the increase of the internal strength of the base paper, and the adhesion between the treated base paper and the polyolefin coating is dependent on the number of carboxyl groups in the carboxylated polyvinyl alcohol used. In fact, the improvement of these characteristics does not appear to be linearly related to connection with the number of carboxyl groups, so that the maximum effect does not appear with the carboxylated polyvinyl alcohol with the largest content of carboxyl group.

The optimum is only achieved if carboxylated polyvinyl alcohols are used which have a carboxyl group content of 1.5 to 7 mol %, and preferably 2.5 to 3.5 mol %. The effect according to the invention is attained by using an aqueous coating mixture for impregnating or surface sizing the paper which contains a carboxylated polyvinyl alcohol as disclosed.

According to a preferred embodiment of the invention, the effect increases if compounds with polyvalent cations are added to the aqueous solution or to the base paper prior to application of polyvinyl alcohol or after application of polyvinyl alcohol. These compounds can be selected from the group of alkaline earth compounds, such as, for example, calcium or magnesium chloride; from the group of aluminum salts, such as, for example, aluminum sulfate or aluminum chloride; and from the compounds of the transition metals. Particularly preferred are salts of zirconium, among which zirconium ammonium carbonate and zirconium orthosulfate are the most preferred, and compounds of chromium, with chromium complexes of the Werner type as the most important compounds.

The weight ratio between the cation compounds and the carboxylated polyvinyl alcohol is preferably between 1:10 and 5:1. If the weight ratio is lower than 1:10, then the effect described in accordance with the invention is not attained. An increase in the weight ratio to values above 5:1 brings no further improvement of the effect in accordance with the invention.

Neither the use of carboxylated polyvinyl alcohol in surface sizing nor the combination of carboxylated polyvinyl alcohol with compounds of polyvalent cations impairs the photographic emulsions.

Although, by using cation compounds or carboxylated polyvinyl alcohol in accordance with the invention, an antistatic application of the paper has already been achieved, additional salt, such as, for example, sodium chloride or potassium chloride, can be added to the aqueous coating mixture, if desired, for the increase of conductivity of the paper surface. The aqueous coating mixture can furthermore contain optical brighteners, anti-foaming agents, pigments, hydrophobizing agents and crosslinking agents, such as, for example, dimethylolurea or trimethylolmelamine.

The invention will now be described in further detail by means of the following examples.

EXAMPLE 1

A base paper, having a basis weight of approximately 175 g/m$^2$, was produced from bleached pulp fiber suspension [LBKP (leaf bleached kraft pulp)/NBSP (needle bleached sulfite pulp)=1/1)], which additionally contained 0.5 weight % polyamidepolyamine-epichlorohydrin resin, 0.5 weight % cationic polyacrylamide, 0.5 weight % anionic polyacrylamide, and 0.4 weight % alkylketenedimer with alkyl groups with 14 to 16 carbon atoms. The paper support was treated with an aqueous coating mixture with the following composition:

| | |
|---|---|
| Water | 1000 g |
| Crotonic acid-modified polyvinyl alcohol, saponification grade 99% | 40 g |
| Zirconium ammonium carbonate | 8 g |
| Sodium chloride | 20 g |

The quantity of application was 2 g/m$^2$. Crotonic acid-modified polyvinyl alcohols with the following carboxyl group content were used:

| | | |
|---|---|---|
| 1a | 0 mol % | (comparison: pure polyvinyl alcohol) |
| 1b | 1.9 mol % | |
| 1c | 2.6 mol % | |
| 1d | 3.1 mol % | |
| 1e | 7.3 mol % | |
| 1f | 100 mol % | (comparison: pure sodium polyacrylate) |

The treated paper was dried and extrusion coated with polyethylene in the usual manner.

EXAMPLE 2

A base paper having a basis weight of approximately 175 g/m$^2$ was produced from bleached pulp [LBKP/NBSP=2/1], which additionally contained 5 weight % sodium stearate and 10 weight % aluminum sulfate. The paper was treated with the coating mixture used in example 1. The quantity applied was 3 g/m$^2$. Crotonic acid-modified polyvinyl alcohols with the following carboxyl group content were used:

| | | |
|---|---|---|
| 2a | 0 mol % | (comparison: pure polyvinyl alcohol) |
| 2b | 1.9 mol % | |
| 2c | 2.6 mol % | |
| 2d | 3.1 mol % | |
| 2e | 7.3 mol % | |
| 2f | 100 mol % | (comparison: pure sodium polyacrylate) |

The treated paper was dried and extrusion coated in the usual manner with polyethylene.

EXAMPLE 3

A base paper, having a basis weight of approximately 140 g/m$^2$, sized by means of 0.3 weight % of alkylketenedimer, 1.6 weight % fatty acid soap and 0.5 weight % aluminum ions in the paper mass, was treated with an aqueous coating mixture which contained a crotonic acid modified polyvinyl alcohol with a saponification grade of 98.5% and a carboxyl group content of 3.1 mol %, in the quantity of 40 g/l. Furthermore, compounds with the following polyvalent cations were added:

| | | |
|---|---|---|
| 3a: | Zirconium ammonium carbonate | |
| | | Weight ratio Cation-compound/polyvinyl alcohol in the coating mixture: |
| 3a1 | | 0/1 |
| 3a2 | | 1/20 |
| 3a3 | | 1/10 |
| 3a4 | | 1/1 |
| 3a5 | | 2/1 |
| 3a6 | | 5/1 |
| 3b: | Chromium complex of the Werner type | |
| 3b1 | | 1/5 |
| 3b2 | | 5/1 |
| 3c: | $CaCl_2$ | 1/1 |
| 3d: | $MgCl_2$ | 1/1 |
| 3e: | $Al_2(SO_4)_3$ | 1/1 |

The application was 1.5 g/m$^2$. The paper was dried and extrusion coated with polyethylene in the usual manner.

EXAMPLE 4

A base paper, having a basis weight of approximately 150 g/m$^2$, and sized in the paper mass in accordance with example 1, was treated with aqueous treatment mixtures with the following compositions:

| | | |
|---|---|---|
| 4a | Water | 1000 g |
| | with isocrotonic acid modified polyvinyl alcohol, saponification grade 99%, carboxyl group content 2.6 mol % | 30 g |
| | Zirconium orthosulfate | 5 g |
| | $CaCl_2$ | 20 g |
| 4b | Water | 1000 g |
| | with acrylic acid modified polyvinyl alcohol, saponification grade 98.5% and carboxyl group content 2.5 mol % | 30 g |
| | $CaCl_2$ | 50 g |
| 4c | Water | 1000 g |
| | with methacrylic acid modified polyvinyl alcohol, saponification grade 96%, carboxyl group content 2.6 mol % | 30 g |
| | $AlCl_3$ | 5 g |
| | NaCl | 20 g |
| | The application was 4.5 g/m2. | |

The treated paper was dried and coated with a polyethylene coating mixtûre with the following composition:

| | |
|---|---|
| 20 weight % | high pressure polyethylene (density 0.963, melt flow index 10) |
| 70 weight % | low pressure polyethylene (density 0.918, melt flow index 7) |
| 9.8 weight % | $TiO_2$ |
| 0.1 weight % | optical brightener |
| 0.1 weight % | stabilizer |
| 300 ppm | polyetherglycol (MW 600) |

EXAMPLE 5

A base paper, having a basis weight of approximately 140 g/m2 and being sized in the paper mass according to Example 3, was treated in a first size press with an aqueous solution containing 4% $CaCl_2$. After a short intermediate drying, the paper was additionally treated in a second size press with the following mixture:

| | |
|---|---|
| crotonic acid modified polyvinyl alcohol saponification grade 99%, carboxyl group content 3.1 mol % | 40 g |
| water | 1000 g |

The coating weight applied in the size presses was 1.5 $g/m^2$ in both cases.

The paper thus treated was finally dryed and extrusion coated with polyethylene in the usual manner.

Testing of the resulting paper support in this case was made after one week's storage.

EXAMPLE 6

A base paper, having a basis weight of approximately 140 $g/m^2$ and being internally sized according to Example 3, was treated in a size press of a paper machine with an aqueous solution containing 4% carboxylated polyvinyl alcohol which has a saponification grade of 99% and is a copolymer containing 3 mol % of acrylic acid. After intermediate drying, both sides of the treated paper were sprayed using a 6% aqueous solution of $CaCl_2$.

The dry coating weight applied in the size press was 1.5 $g/m^2$ and by spraying 1.0 $g/m^2$.

The treated and dryed paper was extrusion coated with polyethylene in the usual manner.

Tests on the resulting paper support were made after one week's storage.

COMPARATIVE EXAMPLE V1

A paper produced in accordance with Example 1 is treated with an aqueous coating mixture with the following composition:

| | |
|---|---|
| Water | 1000 g |
| With itaconic acid modified polyvinyl alcohol grade 98%; carboxyl group portion 2.6 mol % | 40 g |
| $CaCl_2$ | 50 g |

The quantity of application was 3 $g/m^2$. The treated paper was dried and extrusion coated with polyethylene in the usual manner.

COMPARATIVE EXAMPLE V2

A paper sheet produced in accordance with Example 2 of DOS No. 32 41 599 was treated with the coating mixture described there (the application quantity is 3 $g/m^2$), subsequently dried, and extrusion coated with polyethylene in the usual manner.

COMPARATIVE EXAMPLE V3

A paper produced in accordance with Example 3 was treated with the coating mixture described under comparative example V1. The application quantity is 3 $g/m^2$. The paper was dried and coated with polyethylene in the usual manner.

COMPARATIVE EXAMPLE V4

A paper sheet manufactured in accordance with Example 3 and having a basis weight of approximately 140 $g/m^2$ was treated (surface sized) with an aqueous solution containing 4% polyvinyl alcohol which was modified with 2.6 mol % of itaconic acid. The saponification grade of the polyvinyl alcohol is 98%. The coating weight after drying the paper was 1.8 $g/m^2$.

The paper treated was coated with polyethylene in the usual manner.

COMPARATIVE EXAMPLE V5

A base paper manufactured in accordance with Example 1 was treated (surface sized) with an aqueous coating mixture having the following composition:

| | |
|---|---|
| Water | 1000 g |
| Crotonic acid-modified polyvinyl alcohol having the saponification grade 88% and a carboxyl group content of 2.6 mol % | 40 g |
| Zirconium ammonium carbonate | 8 g |
| Sodium chloride | 20 g |

The treated paper was dried and extrusion coated with polyethylene in the usual manner.

Examination of the support materials

Both the impregnated or treated paper sheet, as well as the polyethylene coated paper support, were subjected to examination.

Examination 1—Examination of the treated paper

In this examination, the developer absorption is determined for the paper (modified Cobb test).

Test pieces of 14 cm×14 cm are cut out from the paper web, weighed precisely, and clamped tight in a cylindrical examination device. About 100 ml of a commercially available photographic developer are added to the cylinder, allowed to work for a period of 50 seconds, and then subsequently poured out. The specimen is rinsed, and then immediately weighed. The extent of the absorption of the developer is cited in g/m$^2$.

(2) Examination of the polyethylene-coated paper support

Examination 2.1—Determination of penetration of the edges:

The test piece is subjected to a simulated photographic developing process, with a commercially available developer containing benzyl alcohol at a temperature of approximately 30 degrees C and over a period of 25 minutes. The penetration of the photographic processing solutions at both edges of the test piece is measured by a measuring device. The measured values are cited as edge penetrations (KE) in mm.

Examination 2.2—Determination of internal strength (splitting strength)

The examination takes place in accordance with the method cited in TAPPI RC 308, with the Internal Bond Impact Tester, Model B. The measured values are cited in 1/1000 foot pounds.

Examination 2.3—Determination of the adhesive strength between the polyethylene coating layer and the impregnated paper The examination takes place with a tensile strength measuring device from the firm A.B. Lorentzen & Wettre, on test strips 15 mm wide and 18 cm long. The removal angle is 180 degrees, and the removal speed 70 mm/min. The measured values are cited in mN/15 mm.

| | Test 1 (g/m$^2$) | Test 2.1 (mm) | Test 2.2 (ft. lb.) | Test 2.3 (mN/15 mm) |
|---|---|---|---|---|
| 1a | 26.4 | 0.69 | 248 | 3.04 |
| 1b | 22.1 | 0.64 | 278 | 4.20 |
| 1c | 20.6 | 0.60 | 297 | 4.36 |
| 1d | 18.7 | 0.53 | 314 | 4.55 |
| 1e | 21.8 | 0.62 | 265 | 4.09 |
| 1f | 29.5 | 0.93 | 244 | 2.72 |
| 2a | 32.4 | 0.81 | 176 | 2.83 |
| 2b | 23.2 | 0.73 | 195 | 3.52 |
| 2c | 22.9 | 0.67 | 205 | 3.69 |
| 2d | 20.2 | 0.59 | 221 | 3.99 |
| 2e | 23.6 | 0.71 | 186 | 3.71 |
| 2f | 37.6 | 1.12 | 171 | 3.47 |
| 3a1 | 27.8 | 0.84 | 247 | 3.12 |
| 3a2 | 25.0 | 0.80 | 254 | 3.20 |
| 3a3 | 19.9 | 0.57 | 292 | 4.45 |
| 3a4 | 19.1 | 0.55 | 298 | 4.49 |
| 3a5 | 18.5 | 0.52 | 305 | 4.52 |
| 3a6 | 19.4 | 0.58 | 286 | 4.41 |
| 3b1 | 19.0 | 0.54 | 302 | 4.51 |

-continued

| | Test 1 (g/m$^2$) | Test 2.1 (mm) | Test 2.2 (ft. lb.) | Test 2.3 (mN/15 mm) |
|---|---|---|---|---|
| 3b2 | 18.3 | 0.51 | 317 | 4.57 |
| 3c | 19.4 | 0.54 | 294 | 4.43 |
| 3d | 19.2 | 0.54 | 293 | 4.42 |
| 3e | 18.6 | 0.52 | 299 | 4.48 |
| 4a | 18.9 | 0.57 | 294 | 4.45 |
| 4b | 18.4 | 0.59 | 289 | 4.41 |
| 4c | 18.1 | 0.60 | 287 | 4.39 |
| 5 | 19.8 | 0.56 | 295 | 4.39 |
| 6 | 18.9 | 0.55 | 299 | 4.43 |
| V1 | 23.5 | 0.90 | 255 | 3.60 |
| V2 | 24.7 | 0.89 | 183 | 3.16 |
| V3 | 22.3 | 0.74 | 233 | 3.48 |
| V4 | 29.4 | 0.96 | 191 | 2.96 |
| V5 | 28.7 | 0.90 | 245 | 2.83 |

Evaluation of the results

Examples 1 to 6 illustrate the effect in accordance with the invention.

The last mentioned measured values show that the optimum in relation to penetration of edges, as well as splitting strength and adhesion to the polyethylene coating layer, resides with a carboxyl group portion of 2.5-3.5 mol %.

The comparison with the coating mixtures described in the state of the art (Comparative Examples V1 to V5), and especially with the Comparative Example V2 used in DOS No. 32 41599, clearly documents the improvement of the values through the use of the coating solutions described in accordance with the invention.

We claim:

1. A water-resistant photographic paper support, comprising a base paper internally sized with at least one hydrophobizing sizing agent, surface sized with an aqueous coating mixture, and coated with a polyolefin on both sides, said aqueous coating mixture including a copolymer of an ethylenically unsaturated monobasic carboxylic acid and vinyl alcohol with a saponification grade of at least 96% and having a carboxyl group content of about 1.5-7 mol. %.

2. The water-resistant photographic paper support of claim 1, wherein said carboxyl group content is about 2.5-3.5 mol. %.

3. The water-resistant photographic paper support of claim 1, wherein said monobasic carboxylic acid is crotonicor iso-crotonic acid.

4. The water-resistant photographic paper support of claim 1, wherein said monobasic carboxylic acid is acrylicor or methacrylic-acid.

5. The water-resistant photographic paper support of claim 1, wherein said carboxylated polyvinyl alcohol has a viscosity between 20 and 50 mPa's at room temperature and in 4% aqueous solution.

6. The water-resistant photographic paper support of claim 1, wherein said carboxylated polyvinyl alcohol is applied to the base paper in an amount of about 0.5-10 g/m$^2$.

7. The water-resistant photographic paper support of claim 6, wherein said amount is about 1-4.5 g/m$^2$.

8. The water-resistant photographic paper support of claim 1, wherein said aqueous coating mixture also includes a compound with polyvalent cations, and said carboxylated polyvinyl alcohol is a copolymer of an ethylenically unsaturated monobasic carboxylic acid and vinyl alcohol.

9. The water-resistant photographic paper support of claim 8, wherein said compound with polyvalent cations is a salt of the alkaline earth metals.

10. The water-resistant photographic paper support of claim 9, wherein said salt is calcium chloride or magnesium chloride.

11. The water-resistant photographic paper support of claim 8, wherein said compound with polyvalent cations is an aluminum salt.

12. The water-resistant photographic paper support of claim 11, wherein said aluminum salt is aluminum sulfate or aluminum chloride.

13. The water-resistant photographic paper support of claim 8, wherein said compound with polyvalent cations is a compound of the transition metals.

14. A water-resistant photographic paper support of claim 13, wherein said compound of the transition metals is a zirconium compound.

15. The water-resistant photographic paper support of claim 14, wherein said zirconium compound is zirconium ammonium carbonate or zirconium orthosulfate.

16. The water-resistant photographic paper support of claim 13, wherein said compound of the transition metals is a chromium compound.

17. The water-resistant photographic paper support of claim 16, wherein said chromium compound is a chromium complex of the Werner type.

18. The water-resistant photographic paper support of claim 8, wherein said compound with polyvalent cations has a weight ratio to the carboxylated polyvinyl alcohol of about 1/10 to 5/1.

19. The water-resistant photographic paper support of claim 1, wherein said base paper also includes at least one compound with polyvalent cations.

20. The water-resistant photographic paper support of claim 19, wherein said carboxylated polyvinyl alcohol is treated with said polyvalent cations after the polyvinyl alcohol has been applied to said base paper.

* * * * *